No. 714,945. Patented Dec. 2, 1902.
H. H. POE.
BRIDLE.
(Application filed Oct. 29, 1901.)
(No Model.)
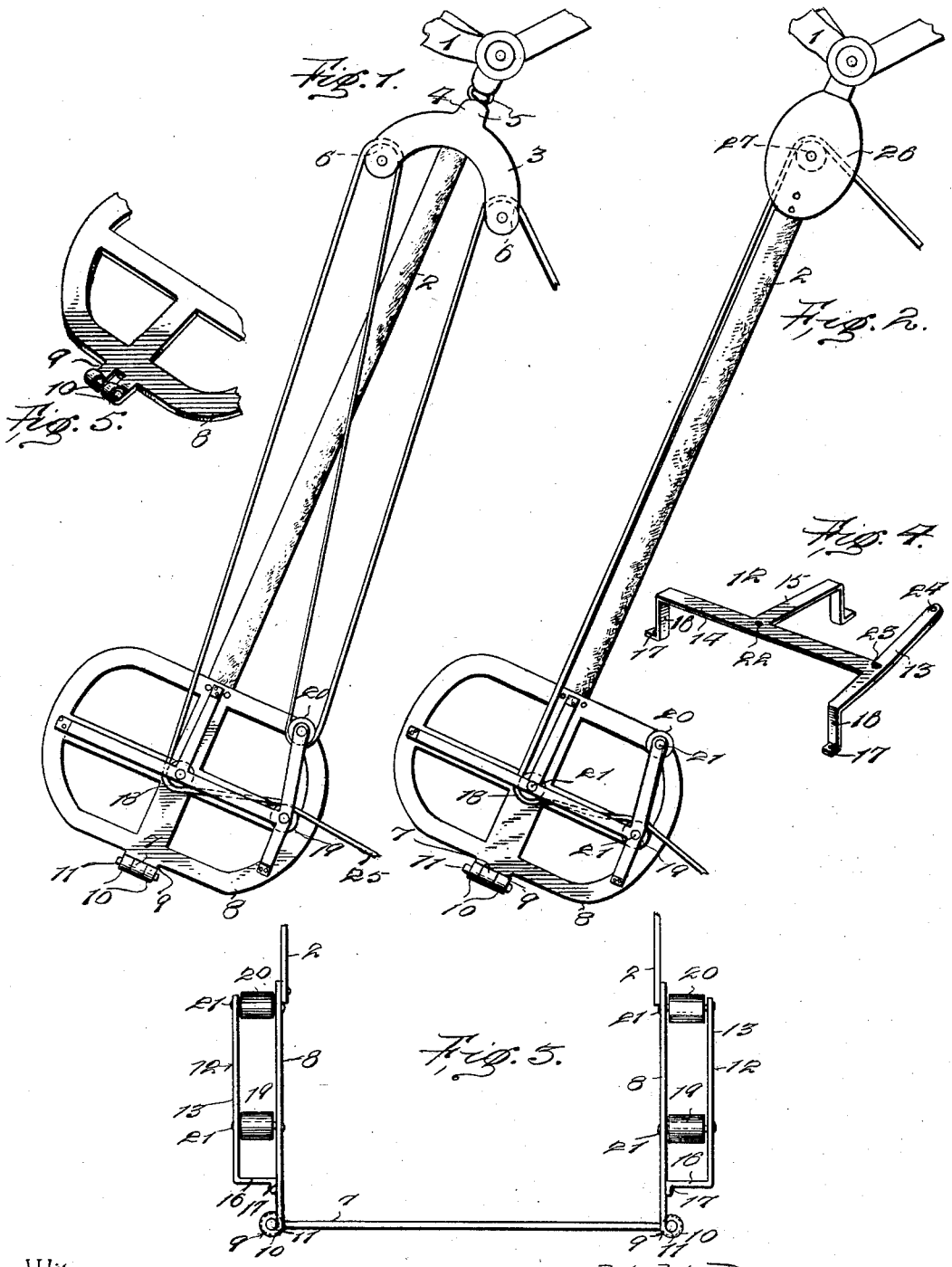
Witnesses
O. M. Simpson,
R. M. Elliott.
H. H. Poe Inventor
by C. A. Snow & Co.
Attorneys

UNITED STATES PATENT OFFICE.

HENRY H. POE, OF MORVEN, GEORGIA.

BRIDLE.

SPECIFICATION forming part of Letters Patent No. 714,945, dated December 2, 1902.

Application filed October 29, 1901. Serial No. 80,456. (No model.)

*To all whom it may concern:*

Be it known that I, HENRY H. POE, a citizen of the United States, residing at Morven, in the county of Brooks and State of Georgia, have invented a new and useful Bridle, of which the following is a specification.

This invention relates to bridles, and particularly to that class known as "safety-bridles."

The object of the invention is to present a bridle of the above character which shall combine simplicity of construction, high efficiency and durability in use, and certainty of operation in controlling an unruly horse.

Under the use of the structure hereinafter described a powerful leverage is secured, so that the bit may be instantly raised in the animal's mouth and taken from his teeth should it show any tendency to hold the same, and such strain may be exerted on the animal's head and mouth as will cause it to yield to the driver. Further, the bridle is constructed in such a manner as while being peculiarly adapted for controlling vicious or spirited animals it may be used in connection with an animal of gentle disposition in the same manner as an ordinary bridle and when employed in checking an unruly animal will not cause pain, but will simply result in the animal being brought under perfect control of the driver.

With these and other objects in view, as will appear as the nature of the invention is better understood, the same consists in the novel construction and combination of parts of a bridle, as will be hereinafter fully described and claimed.

In the accompanying drawings, forming a part of this specification, and in which like numerals of reference indicate corresponding parts, there is illustrated a form of embodiment of the invention capable of carrying the same into practical operation, it being understood that the elements therein exhibited may be varied or changed as to shape, proportion, and exact manner of assemblage without departing from the scope of the invention.

In the drawings, Figure 1 is a view in side elevation, exhibiting one form of embodiment of the invention. Fig. 2 is a similar view of another form of embodiment thereof. Fig. 3 is a view in front elevation of the lower portion of the device. Fig. 4 is a perspective detached detail view of the bridge, associated with the bit-plate for holding the sheaves or rolls in operative relation to the plate and also for bracing the same. Fig. 5 is a detached detail view of a portion of one of the bit-plates.

Referring to the drawings, 1 designates the headstall, and 2 one of the cheek-straps, of an ordinary bridle, and as these parts may be of the usual or any preferred construction detailed description thereof is deemed unnecessary.

The safety attachments on each side of the bridle are counterparts of each other, so that a description of one will serve for both.

Secured in any suitable manner to the headstall is a yoke 3, constituting a gag-runner and consisting in this instance of two curved plates connected by an arch 4, the crest of which is provided with a loop 5, to which is connected a means for associating the yoke with the headstall, the outer extremities of the yoke members having secured between them two sheaves 6, which may be either grooved or flat, as preferred, grooved sheaves being employed when the rein is round and plain cylindrical sheaves being employed when the rein is flat.

The bit 7, which may be of any preferred style, is carried by two bit-plates 8, each being by preference a skeleton structure for purposes of lightness and approximately rectangular in form with rounded corners. The plate is provided on its lower side with a transversely-orificed ear 9, comprising two members 10, between which the extremities of the bit are mounted, a pin 11, passed through the ears and through a ring or opening in the ends of the bit, serving to hold the parts assembled. The pin 11 is made detachable and may be a bolt, so that when it is desired to change the character of the bit—that is to say, to substitute a bit of one style with one of another style—this may readily be accomplished. The cheek-strap 2 is connected with the bit-plate in any preferred manner, as by having its lower end passed through one of the openings in the plate and turned upon itself and then sewed or riveted together, or it may be riveted to the plate, as shown in Fig. 1. Secured to the plate is a bridge 12, comprising three members 13, 14, and 15, these members by preference being integral with each other and the structure as a whole being formed by being stamped from a suitable piece of metal. One end of each of the members is bent at right angles to its length, as shown at 16, and then outward at right angles to the downturned or leg portions to present toes 17, which are suitably secured to the bit-plate, as by being riveted or otherwise attached thereto. The legs 16 serve to hold the three members permanently spaced from the bit-plate to permit of insertion therebetween of three sheaves 18, 19, and 20, which may be either grooved or plain, according to the character of rein employed, as before pointed out. The sheaves are held in operative relation to the bit-plate by pins or bolts 21, which pass through openings 22, 23, and 24 in the members 13 and 14 and into the bit-plate, the ends of the pins or bolts being upset or headed to insure of their positive assemblage with the bridge and the bit-plate. The sheaves are to be associated with their bearings in such manner as readily and easily to rotate thereon and to be free from danger of becoming rust-locked, and to effect this end they may be made of a non-oxidizable metal or of a hard close-grained wood, such as lignum-vitæ.

In associating the rein with the attachment described the rein is first passed through the terret-ring of the saddle, thence over the sheave 19, thence under the sheave 18, thence upward over the forward sheave of the yoke, thence down under and around the sheave 20, thence upward and over the rear sheave of the yoke, and is thence passed back and secured to the check-hook of the saddle. It will be seen that when the rein 25 is drawn upon the action on the bit through the arrangement of the sheaves is that of a compound pulley, so that with the output of a minimum amount of energy great force can be transmitted to the bit, which will result in a firm, positive, and yet painless manner in forcing the bit from between the animal's teeth and back into the corner of its mouth, thus enabling the driver to obtain and maintain complete control over the animal. By reason of the manner in which the sheaves on the bit-plate are braced by the members of the bridge they will be positively held against springing, so that their ready rotation under all conditions in use may be assured.

The device as a whole is exceedingly simple of construction and may be applied to an ordinary bridle without necessitating any objectionable change in its structural arrangement.

While the bit-plate is herein shown as an approximately regular skeleton plate, it is to be understood that the invention is not to be limited to this precise arrangement, as the plate may be otherwise contoured or constructed and still be within the scope of the invention. A point to be observed in this form of embodiment of the invention, as well as that now to be described, is that the sheave 18, to which direct strain or draft is applied and is centered from the sheaves of the yoke, is in alinement with the bit, so that the pull from the rein is direct and the draft is applied to the bit in exact line with the center of force which focuses on the said sheave, and by this arrangement all the energy exerted in checking a horse is utilized for effective work.

The embodiment of the invention above described is intended more particularly for use in controlling fractious or vicious horses; but where it is desired to employ a bit having this attachment upon a mild or gentle horse the double-sheaved yoke (shown in Fig. 1) is dispensed with and a yoke or gag runner 26, having a single sheave, as shown in Fig. 2, is substituted in its place, or, if preferred, to get the same result the form of yoke shown in Fig. 1 may be provided with a third sheave disposed intermediate of the ends of the yoke members, and as this will be obvious detailed illustration is deemed unnecessary. When a gag-runner having but a single sheave is employed, as shown in Fig. 2, the sheave 20 of the bit-plate is a dead element, as the rein will first be passed over the sheave 19, thence under the sheave 18, thence upward and over the sheave 27 of the gag-runner, and thence back to and into engagement with the check-hook of the saddle.

As will be seen from the foregoing description, the device of this invention is exceedingly simple of construction, will be thoroughly effective in use for the purpose designed, and as its adaptation to a bridle already made may be readily effected it will recommend itself to persons desiring a device of this character.

Having thus fully described my invention, what I claim as new, and desire to secure by Letters Patent, is—

1. A bridle comprising a headstall and cheek-straps, a sheave-carrying yoke supported from each side of the headstall, a bit-carrying plate secured to each of the cheek-straps, and sheaves associated with the plates, one of the sheaves being located approximately at the center of each plate and the others toward the rear thereof.

2. A bridle comprising a headstall and cheek-straps, a sheave-carrying yoke supported from each side of the headstall, a bit-carrying plate secured to each of the cheek-straps, a bridge secured to each plate, and sheaves held associated with the plates by the bridges, one of the sheaves being located approximately at the center of the plates and the others toward the rear thereof.

3. A bridle comprising a headstall and cheek-straps, a yoke supported from each side of the headstall and carrying a pair of sheaves, a bit-carrying plate secured to each of the cheek-straps, a bridge secured to each plate, sheaves mounted for operation between each plate and the bridge, one of the sheaves being located approximately at the center of the plate and the others toward the rear thereof, a pair of reins, one end of each of which is passed over the sheave at the rear central portion of the plate, thence under the central sheave, thence upward and over the forward sheave of the yoke, thence down and around the remaining sheave of the plate, thence upward and over the remaining sheave of the yoke and thence rearward and into engagement with the check-hook of the saddle, substantially as described.

In testimony that I claim the foregoing as my own I have hereto affixed my signature in the presence of two witnesses.

HENRY H. POE.

Witnesses:
  NEILL M. MCDONALD,
  R. N. OUSLEY.